Sept. 17, 1946.      B. M. HARRISON      2,407,661
SUBMARINE SIGNALING DEVICE
Filed April 26, 1940      2 Sheets-Sheet 2

INVENTOR.
Bertram M. Harrison
BY
ATTORNEY.

Patented Sept. 17, 1946

2,407,661

UNITED STATES PATENT OFFICE 2,407,661

SUBMARINE SIGNALING DEVICE

Bertram M. Harrison, Newton Highlands, Mass., assignor, by mesne assignments, to Submarine Signal Company, Boston, Mass., a corporation of Delaware Application April 26, 1940, Serial No. 331,804

8 Claims. (Cl. 177—386)

The present invention relates to a submarine signaling system and more particularly to a signaling system in which a ship may detect the presence of another vessel or obstacle in its vicinity and determine rapidly both its distance and direction.

Various systems have been successfully employed heretofore for detecting other vessels and obstacles from a moving or stationary vessel but in most of these cases it has been recognized that considerably more time is consumed before a definite bearing and distance can be established than is desirable.

In the present invention the apparatus and system employed make it possible to listen at all times for obstacles or vessels in the vicinity of the listening station and then to locate more accurately both the position of these bodies and their distances with great rapidity and facility.

The present invention is preferably carried out with the aid of supersonic apparatus composed of a group of directional receiving and transmitting units which when used in combination become a non-directional receiver or transmitter.

Figure 1:
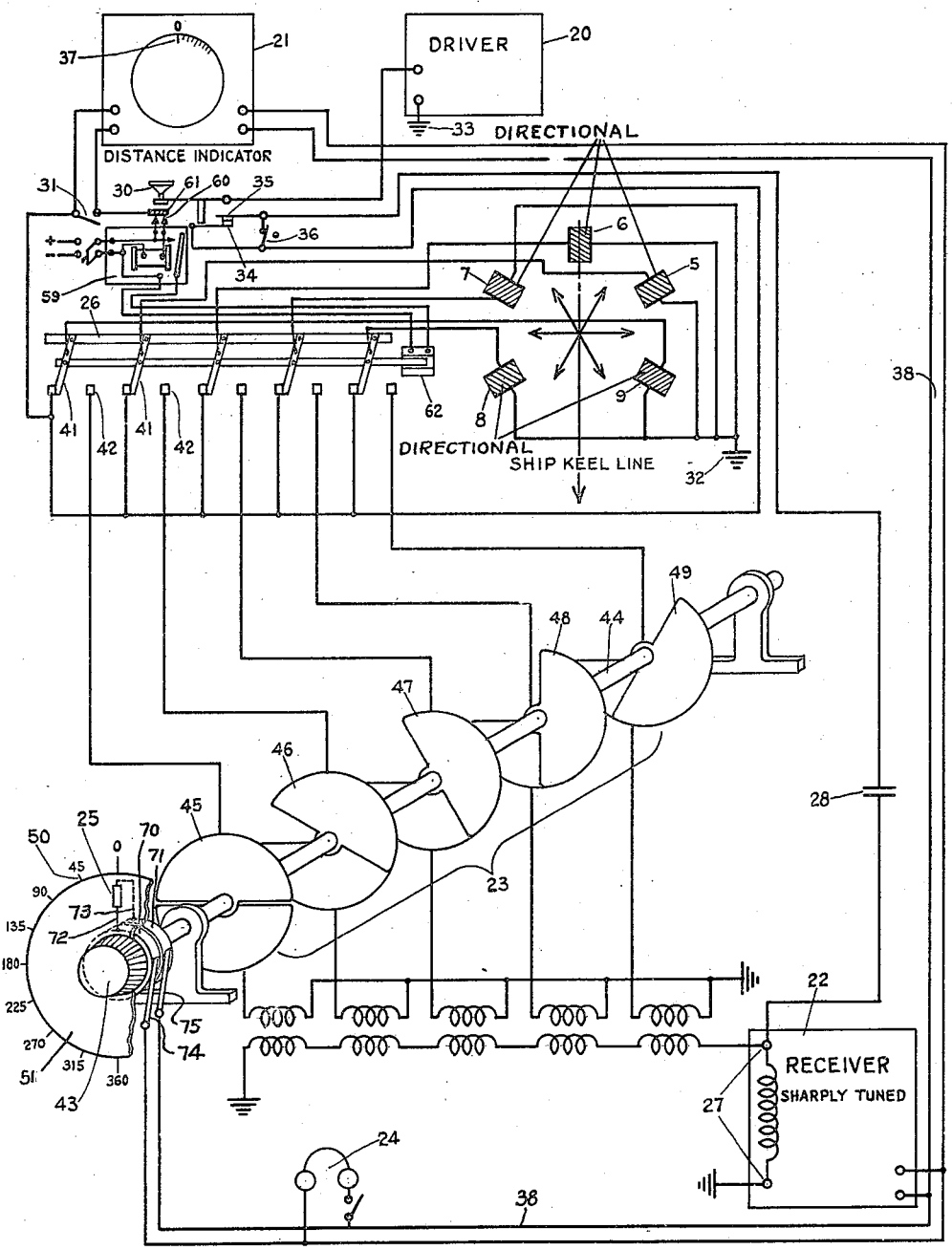
Figure 2:
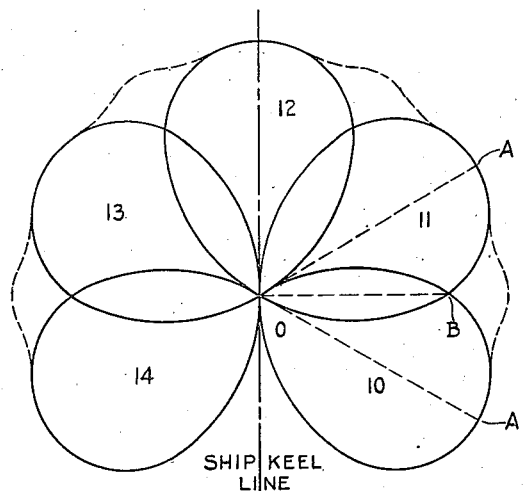
Figure 4:
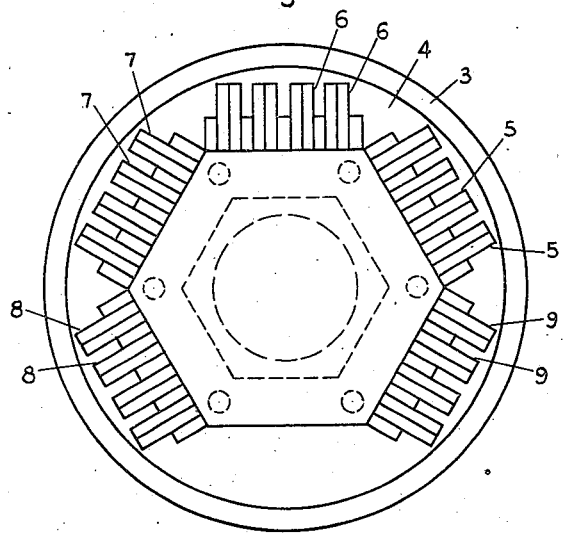
Figure 3:
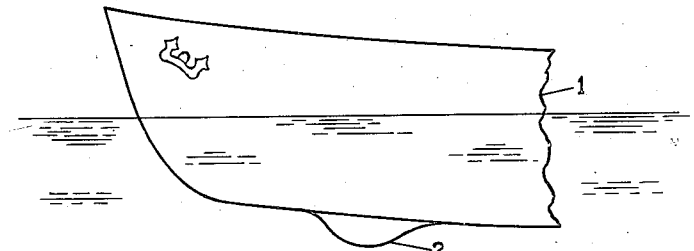

Without further describing the merits and advantages of the present invention, the invention will now be described in connection with the drawings showing an embodiment of the same in which Fig. 1 represents a schematic diagram of the system; Fig. 2 shows the intensity and distribution curves of the sound transmitting and receiving unit; Fig. 3 shows the apparatus as positioned on the vessel; and Fig. 4 shows a plan view of the transmission and receiving unit.

In accordance with the drawings, the transmitting and receiving unit may be mounted in a vessel I towards the forward end as indicated at 2 in the outwardly bulging tank or blister (Fig. 3). In this type of mounting the unit itself may be contained in a housing with suitable acoustic conductive means between the unit itself and the water medium. In Fig. 4 a suitable unit for this system is shown which is of the type described in my copending application Serial No. 309,992, filed December 19, 1939. This transmission and receiving unit, as shown in Fig. 4, comprises a housing 3 of sound transparent material which may be filled on the inside 4 with suitable liquid, such as oil or the like, in which the receiving elements themselves are immersed. As described in the above-mentioned application, these may comprise Rochelle salt units 5, 5, etc., 6, 6, etc., 7, 7, etc., 8, 8, etc., and 9, 9, etc., each group facing in different directions determining and establishing an intensity distribution curve as indicated in Fig. 2. For further reference to this transmission and receiving unit the above-mentioned application is referred to, it being here sufficient to note that each of the groups 5, 6, 7, 8 and 9 has individually a beam pattern with an angular opening of substantially 60° as shown by the loops 10, 11, 12, 13 and 14 and a combined intensity curve of the peripheral contour indicated in Fig. 2 in which the peripheral line formed by the partly solid and partly dotted portions is the intensity curve.

The device is so arranged on the vessel that the ship's keel line, as indicated in Fig. 2, is symmetrically positioned with respect to the intensity and distribution curves. As will be noted from this figure, the distribution of the intensity is such that it is substantially uniform about the entire 360° except the after section in the direction of the ship's propellers. This section from a point of view of listening for obstacles or strange bodies is relatively unimportant since there is little likelihood of collision as the listening vessel is already in general proceeding away from the obstacle. Each of the individual beam patterns, as indicated in Fig. 2, which are polar diagrams plotted in angles as directions and in decibels as intensity ratio, overlaps the adjacent beam pattern in such a manner that the total added energy of adjacent units at any point of the curve or for any direction is approximately constant and substantially equal to the maximum energy at the center of the beam. In this way, as will be seen from the description below, the intensity of the received signal in any direction will be substantially equal to the intensity at the maximum point of the individual beam with the result that there is substantially little variation in intensity of the received signal between adjacent beams. The receiving circuits for each unit when used alone also preserves this same relationship since the resonance curves are so designed that the amplitude or response of each circuit as it is being tuned has a magnitude for any direction corresponding to the pattern of the directional beam for each unit. For this purpose the magnitude of the vector from the origin O to any intersection, as, for instance OB, is approximately 3 decibels lower than the vector magnitude of the maximum OA, the sum of the two intersecting vectors being substantially equal to OA.

The circuit arrangement for the system is shown in Fig. 1. Here the sending and receiving device which is frequently called a projector or transceiver, especially when the frequency used is in the supersonic range, which range is particularly applicable for the equipment described and for the system employed, is usually supplied with power through an oscillatory circuit or oscillatory power source designated in Fig. 1 by 20. Completing the equipment of this system is a distance indicator or distance measuring device 21, a thermionic valve receiver 22, which may have an amplifier and such necessary apparatus as to operate the indicating and listening devices connected therewith, and which is preferably sharply tuned as indicated by the legend, a selective tuning device 23 and control switches as will be described below.

In the circuit arrangement, as shown in Fig. 1, the switches are closed in positions for a standby listening device, that is to say, the listener or observer will hear an audible signal in the telephone head set 24 or observe an indication on the visual indicator 25, such as a neon discharge tube which is permanently connected in circuit, if a sound source including a reflecting source or an original source, is within range and bearing according to the peripheral intensity curve outlined in Fig. 2. In this position all of the units 5, 6, 7, 8 and 9 are connected in parallel to each other through the multiple pole switch 26 and in series with the input terminals 27 of the receiver 22 and a condenser 28 if that is necessary. This arrangement, it will be noted, will make it possible to receive a signal or listen to an approaching vessel either by an echo reflected from it or by noises such as propeller or other noises within the whole side and forward range of the listening vessel with the exception only of a small sector in the direction of the vessel's stern where the propellers always make listening extremely difficult.

This position of the system may be used subsequent to the transmission of a signal or sound from the projector by means of the power source 20. When it is desired to emit a signal from the projector units, this will be accomplished by depressing the key 30, which thereby impresses the oscillations of the driver source 20 upon the projector through the switch 31, which at such times should be closed, eliminating the distance indicator, and the multiple pole switch 26 which connects to one terminal of each of the projector units. The other terminal of the projector units is grounded as indicated at 32, the driver itself being grounded as shown at 33. In this way all of the projector units are operated in parallel. The key 30 may be controlled manually as indicated in the system or automatically and may be operated periodically by some known code device for this purpose.

As shown in Fig. 1 when the key 30 is depressed, the connection between contacts 34 and 35 is broken which will open the circuit to the receiver 22 provided the switch 36 has been thrown to the right. This arrangement will be used where it is not desired to have the direct signal affect the receiver.

After the presence of a vessel or foreign body in the listening range has been determined, its distance may be determined by the operation of the distance indicator 21. In this case the switch 31 is allowed to remain open and the key 30 is held depressed with the switch 36 in the position indicated in the figure. The oscillating power supply source 20 thereby supplies power through the key 30, which is kept closed, and the sending contacts (not shown) of the distance indicator by means of which an impulse or signal will be sent out as the indicator 37 in its rotation passes a selected position on the distance scale. This signal emitted simultaneously by the projectors 5, 6, 7, 8 and 9 is also received by them after being reflected from the distant object or obstacle and thereupon amplified through the receiver 22 and impressed over the lines 38 on the distance indicator 21 to produce a visual signal in the indicator 37. Any suitable distance indicator may be employed in the present arrangement such as, for instance, that shown in U. S. Patent No. 2,033,160 to Edwin E. Turner, Jr.

For sound ranging purposes to determine the direction of a vessel or obstacle by means of reflected echoes, the projectors are first used to send out a sound signal in substantially all directions except the aft section of the vessel. For this purpose the switch 36 may be opened and then switch 31 closed. In this position when the key 30 is depressed for a short time interval, a sound signal is sent out from the projector as previously described. Simultaneously with the sending of the signal the circuit to the receiver between the contacts 34 and 35 is broken and restored again when the key 30 is released. In this latter position the head telephone 24, which is connected across the output receiver lines 38, and the indicator 25 will pick up any echo reflected within the operating range of the apparatus. The terminals of indicator 25 are connected by leads 72 and 73 to the slip rings 70 and 71 on which the brushes 74 and 75 bear, which, in turn, are connected across the conductors 38. In order to determine the direction of the reflecting source more exactly, the multiple pole switch 26 is thrown to the right either manually or by the time delay relay 59 operated through contacts 60 when the key 30 is depressed which brings the switch plate 61 against the contact 60 and thereby energizes the solenoid 62 to throw the switch 26 to the right a given time interval after the circuit through the contacts 60 is completed. This connects the poles 41, 41, with the contacts 42, 42 at the right of the switch, as indicated in Fig. 1. While key 30 is thus operated, the knurled knob 43 may be turned to successively, selectively tune each of the projector elements 8, 7, 6, 5, 9, respectively. The knob 43, it will be noted, operates the shaft 44 which carries the rotor parts 45, 46, 47, 48 and 49. The signals sent out by the projector units 8, 7, 6, 5, 9 are all tuned to the same frequency and preferably are of a high frequency in the supersonic range so that resonant tuning for each receiver unit may be used. The rotors 45, 46, 47, 48 and 49 successively tune each of the projector unit circuits according to the curves of Fig. 2 for resonance at positions of the indicator 25 corresponding to scale reading on the scale 50 calibrated in conformity to the beam pattern of the projector units. For this purpose the phase of each of the condenser rotors 45, 46, 47, 48 and 49 is advanced with respect to each other a uniform angular distance, for instance, if the advance of each of these rotors is 30° over the rotor preceding it, then a semi-circle arc on the scale 50 will be calibrated in 360°. As the indicator 25 mounted on the disc 51 is rotated by means of the knob 43, each of the units 8, 7, 6, 5 and 9, which are themselves directive in the beam patterns 14, 13, 12, 11 and 10, respectively, will be tuned to receive the incoming signal according to the curve of Fig. 2 and will thereby operate the indicator 25 as a sum of the signals on the individual units or produce an audible signal in the head phones 24. The position of the indicator 25 at this moment with reference to the scale 50 will indicate the bearing of the sound source.

The tuning condensers for each receiver substantially maintain the directive beam pattern for each unit. Since each pickup unit itself may have a beam pattern substantially as indicated by one full-line loop of Fig. 2, the tuning condensers for the pickup unit connected to it may be so designed simply to maintain approximate resonance as the condenser plates are rotated through the angle embraced by the extreme tangents at the origin of the chart for its particular loop. The transmission of the signal through the control by the key 30 may be manual, in which case the length of the signal and the intervals at which they are sent can be controlled at will; or if an automatic system is desired for controlling the key 30, suitable selection of signal lengths and time intervals may be made by proper choice of the code device which is used. If the echo from the object lies between the beam patterns of two successive units, then it will be picked up in a position between the tuning of these units and will therefore operate the indicator in the corresponding position. Having now described my invention, I claim:

1. A system for sound detection comprising, in combination, a sound pickup device composed of units each having individual similar directive beam patterns with the axes thereof in spaced selected directions, and together having a substantially uniform pattern in the whole desired listening sector, a plurality of electrical circuits, one for each of said units having means for tuning the circuits substantially in accordance with said beam pattern at a chosen listening frequency, said last means for each unit being displaced in tuning phases one from the other by amounts corresponding to the spacing of the beam axes, control means for the common operator for the tuning, and means operatively connected to said electrical circuits for producing an indication of the sound picked up by said units corresponding to the direction from which it is received.

2. A system for sound detection comprising, in combination, a sound pickup device composed of units each having individual similar directive beam patterns with the axes thereof in spaced selected directions, and together having a substantially uniform pattern in the whole desired listening sector, a plurality of electrical circuits, one for each of said units having means for tuning the circuits substantially in accordance with said beam pattern at a chosen listening frequency, said last means for each unit being displaced in tuning phases one from the other by amounts corresponding to the spacing of the beam axes, control means for the common operator for the tuning, means operatively connected to said electrical circuits and variably controlled as to position by said control means for producing an indication of the sound picked up by said units corresponding to the direction from which it is received, and a scale associated with the position of the indicator for establishing the direction from which the sound is picked up.

3. A system for sound detection comprising, in combination, a sound pickup device composed of units each having individual similar directive beam patterns with the axes thereof in spaced selected directions and together having a substantially uniform pattern in the whole desired listening sector, electrical responsive and indicating means, switching means operatively connecting said units with said electrical responsive means for selectively listening either to the sound picked up by each unit or simultaneously to the sound picked up by all the units in the whole desired listening sector, and means included in said electrical responsive means for resonating each of said units with the signal in succession.

4. A system for sound detection comprising, in combination, a sound pickup device composed of units each having individual similar directive beam patterns with the axes thereof in spaced selected directions and together having a substantially uniform pattern in the whole desired listening sector, electrical responsive and indicating means, switching means operatively connecting said units with said electrical responsive means for selectively listening either to the sound picked up by each unit or simultaneously to the sound picked up by all the units in the whole desired listening sector, and means included in said electrical responsive means for resonating each of said units with the signal in succession, said last means comprising a plurality of individual condensers having rotors and stators mounted with permanent phase displacements with respect to each other.

5. A system for sound detection comprising, in combination, a sound pickup device composed of units each having individual similar directive beam patterns with the axes thereof in spaced selected directions and together having a substantially uniform pattern in the whole desired listening sector, electrical responsive and indicating means, switching means operatively connecting said units with said electrical responsive means for selectively listening either to the sound picked up by each unit or simultaneously to the sound picked up by all the units in the whole desired listening sector, and means included in said electrical responsive means for resonating each of said units with the signal in succession, said last means comprising a plurality of individual condensers having fixed stators and rotatable rotors mounted on the same shaft with said rotors having a fixed phase displacement with respect to said stators, the phase displacement of the condensers differing by the same amount from each other, said shaft also carrying an indicating device adapted to indicate the signal received by the sound pickup device.

6. A system for sound detection comprising, in combination, a sound pickup device composed of units each having individual similar directive beam patterns with the axes thereof in spaced selected directions and together having a substantially uniform pattern in the whole desired listening sector, electrical responsive and indicating means, and switching means operatively connecting said units with said electrical responsive means for selectively listening either to the sound picked up by each unit or simultaneously to the sound picked up in the whole desired listening sector, said switching means including means for connecting said units directly in parallel to each other for listening in the whole desired listening sector or in series circuits adapted to be tuned for listening in selected directions and means selecting one unit and tuning only the circuit associated therewith for establishing the direction of the sound source.

7. A system for sound detection comprising, in combination, means for determining the distance of an object by means of the echo time-of-travel method including a sound transmission and pickup device composed of units each having individual similar directive beam patterns with the axes thereof in spaced selected directions, and together having a substantially uniform pattern in the whole desired listening sector, means manually controllable for transmitting a signal from said transmission and pickup device in all directions of the listening sector for measuring the distance of an object within the observing range and means for shifting to individual listening on each of said units for determining the direction of the echo from said object, said last means including switching means for connecting said units directly in parallel to each other for operating in the whole desired listening sector and in series circuits adaptable to be tuned for determining the direction of the echo from said object and means selecting one unit and tuning only the circuit associated therewith for establishing the direction of the sound source.

8. A system for sound detection comprising, in combination, a sound pickup device composed of units each having individual similar directive beam patterns with the axes thereof in spaced selected directions and together having a substantially uniform pattern in the whole desired listening sector, a sharply tuned receiver, an indicator operated thereby, a plurality of electrical circuits, each selectively tunable with one of said units and having connections for operating said tuned circuits and switching means for connecting said pickup units either directly to said sharply tuned receiver or through said plurality of electrical circuits and means selecting one unit and tuning only the circuit associated therewith for establishing the direction of the sound source.

BERTRAM M. HARRISON.